(12) United States Patent
Lee et al.

(10) Patent No.: US 12,532,654 B2
(45) Date of Patent: Jan. 20, 2026

(54) FLEXIBLE DISPLAY DEVICE

(71) Applicant: LG Display Co., Ltd., Seoul (KR)

(72) Inventors: MinHo Lee, Geoje-si (KR); Eun Roh, Seoul (KR); Changwoo Chun, Cheonan-si (KR); Giyoun Kim, Goyang-si (KR); Sejin Jang, Paju-si (KR); Minwan Kim, Paju-si (KR); Yeonjae Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 17/984,965

(22) Filed: Nov. 10, 2022

(65) Prior Publication Data
US 2023/0200204 A1 Jun. 22, 2023

(30) Foreign Application Priority Data
Dec. 22, 2021 (KR) .................. 10-2021-0184600

(51) Int. Cl.
*H10K 85/20* (2023.01)
*G06F 1/16* (2006.01)
(Continued)

(52) U.S. Cl.
CPC ......... *H10K 85/221* (2023.02); *G06F 1/1652* (2013.01); *H10K 50/8426* (2023.02); *H10K 77/111* (2023.02)

(58) Field of Classification Search
CPC ............ H10K 85/221; H10K 50/8426; H10K 50/841; H10K 77/111; H10K 2102/311;
(Continued)

(56) References Cited

U.S. PATENT DOCUMENTS

| 2016/0357052 A1 | 12/2016 | Kim et al. |
| 2018/0102496 A1* | 4/2018 | Kim .................. H10K 59/8794 |
| 2018/0149904 A1 | 5/2018 | Song et al. |

(Continued)

FOREIGN PATENT DOCUMENTS

| CN | 103207672 A | * | 7/2013 | ........... G06F 1/1652 |
| CN | 107195795 A | * | 9/2017 | ......... H01L 27/3244 |

(Continued)

OTHER PUBLICATIONS

Zhang_English, zhang translation (Year: 2013).*
(Continued)

*Primary Examiner* — Tod T Van Roy
*Assistant Examiner* — Alexander Ehrlich
(74) *Attorney, Agent, or Firm* — Morgan, Lewis & Bockius LLP

(57) ABSTRACT

The present disclosure relates to a flexible display device, and according to an aspect of the present disclosure, a flexible display device includes a display panel including a folding area and a non-folding area; a back plate which is disposed below the display panel and supports the display panel; and a bottom plate which is disposed below the back plate and includes a plurality of grooves so as to correspond to the folding area, and a plurality of nano helix structures disposed so as to correspond to the plurality of grooves. Therefore, the flexible display device forms a groove pattern in the bottom plate, and includes a nano helix structure in each of the plurality of grooves, to effectively relieve the folding stress and reduce the visibility of the pattern, finally an appearance quality may be improved.

14 Claims, 15 Drawing Sheets

(51) Int. Cl.
*H10K 50/842* (2023.01)
*H10K 77/10* (2023.01)

(58) Field of Classification Search
CPC .... G06F 1/1652; G06F 1/1656; G06F 1/1681; Y02E 10/549; G09F 9/301
See application file for complete search history.

(56) References Cited

U.S. PATENT DOCUMENTS

| | | | |
|---|---|---|---|
| 2019/0207141 A1* | 7/2019 | Kim | H10K 50/841 |
| 2019/0213924 A1 | 7/2019 | Ha et al. | |
| 2019/0373743 A1* | 12/2019 | Liu | G06F 1/1652 |
| 2020/0052239 A1 | 2/2020 | Kim et al. | |
| 2020/0166970 A1 | 5/2020 | Yeom | |
| 2021/0150943 A1* | 5/2021 | Cui | G06F 1/1652 |
| 2021/0323287 A1 | 10/2021 | Park et al. | |

FOREIGN PATENT DOCUMENTS

| | | | | |
|---|---|---|---|---|
| CN | 108122489 A | 6/2018 | | |
| CN | 108538208 A | 9/2018 | | |
| CN | 110010001 A | 7/2019 | | |
| CN | 110021236 A | 7/2019 | | |
| JP | 2020076959 A | * 5/2020 | ............ | B32B 27/08 |
| KR | 10-2016-0081025 A | 7/2016 | | |
| KR | 10-2019-0080740 A | 7/2019 | | |
| KR | 20200036580 A | * 4/2020 | ............ | G09F 9/301 |
| KR | 10-2020-0063801 A | 6/2020 | | |
| KR | 10-2021-0058433 A | 5/2021 | | |

OTHER PUBLICATIONS

Di_English, di translation (Year: 2017).*
Ki_English, ki translation (Year: 2020).*
Joo_English, joo translation (Year: 2020).*
Office Action dated May 29, 2025 from the CNIPA in connection with the counterpart Chinese Application 202211181797.0.
Office Action dated Sep. 8, 2025 issued in the corresponding Korean Patent Application No. 10-2021-0184600. (Note: US 2019/0373743 A1 already submitted.).
Notice of Allowance dated Sep. 29, 2025 issued in Chinese Application application 202211181797.

* cited by examiner (a)

(b)

(c)

(a)

(b)

(a)

(b)

(a)

(b)

FLEXIBLE DISPLAY DEVICE

CROSS-REFERENCE TO RELATED APPLICATIONS

This application claims the priority of Korean Patent Application No. 10-2021-0184600 filed on Dec. 22, 2021, in the Korean Intellectual Property Office, the disclosure of which is incorporated herein by reference.

BACKGROUND

Technical Field

The present disclosure relates to a flexible display device, and more particularly, to a flexible display device in which a pattern of a bottom plate is not externally visible while maintaining a high folding characteristic and a high reliability to have an excellent appearance quality.

Discussion of the Related Art

Recently, as it enters an information era, a display field which visually expresses electrical information signals has been rapidly developed and in response to this, various display devices having excellent performances such as thin-thickness, light weight, and low power consumption have been developed. Specific examples of such a display device include a liquid crystal display device (LCD), a plasma display panel device (PDP), a field emission display device (FED), and an organic light emitting display device (OLED).

In the meantime, efforts are being continued to diversify a shape and a size of the display device. For example, display devices having various shapes, such as a curved display device having a curved surface or a flexible display device which maintains its display performance even in a bent or curved state, are consistently being developed. A display panel of the flexible display device uses a flexible substrate so that a support member, such as a back plate or a bottom plate, is disposed below the display panel to suppress the sagging of the display panel and protect the display panel from foreign substances and impact from the outside.

SUMMARY

In a back plate and/or a bottom plate used for a flexible display device, an opening pattern is formed in a folding area to ensure a folding characteristic. However, in this case, there is a problem in that the opening pattern is visible to a user, which deteriorates an appearance quality.

Accordingly, embodiments of the present disclosure are directed to a flexible display device that substantially obviates one or more of the problems due to limitations and disadvantages of the related art.

Therefore, an aspect of the present disclosure is to provide a flexible display device with an excellent appearance quality by minimizing the visibility of the pattern of the support member to the user while maintaining a high foldability and reliability.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a flexible display device comprises a display panel including a folding area and a non-folding area; a back plate which is disposed below the display panel and supports the display panel; and a bottom plate which is disposed below the back plate and includes a plurality of grooves so as to correspond to the folding area, and a plurality of nano helix structures disposed so as to correspond to the plurality of grooves.

Other detailed matters of the exemplary embodiments are included in the detailed description and the drawings.

According to the exemplary embodiment of the present disclosure, the flexible display device forms a groove pattern in the bottom plate, rather than the opening pattern and includes a nano helix structure in each of the plurality of grooves, to effectively relieve the folding stress and reduce the visibility of the pattern. Therefore, an appearance quality may be improved.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
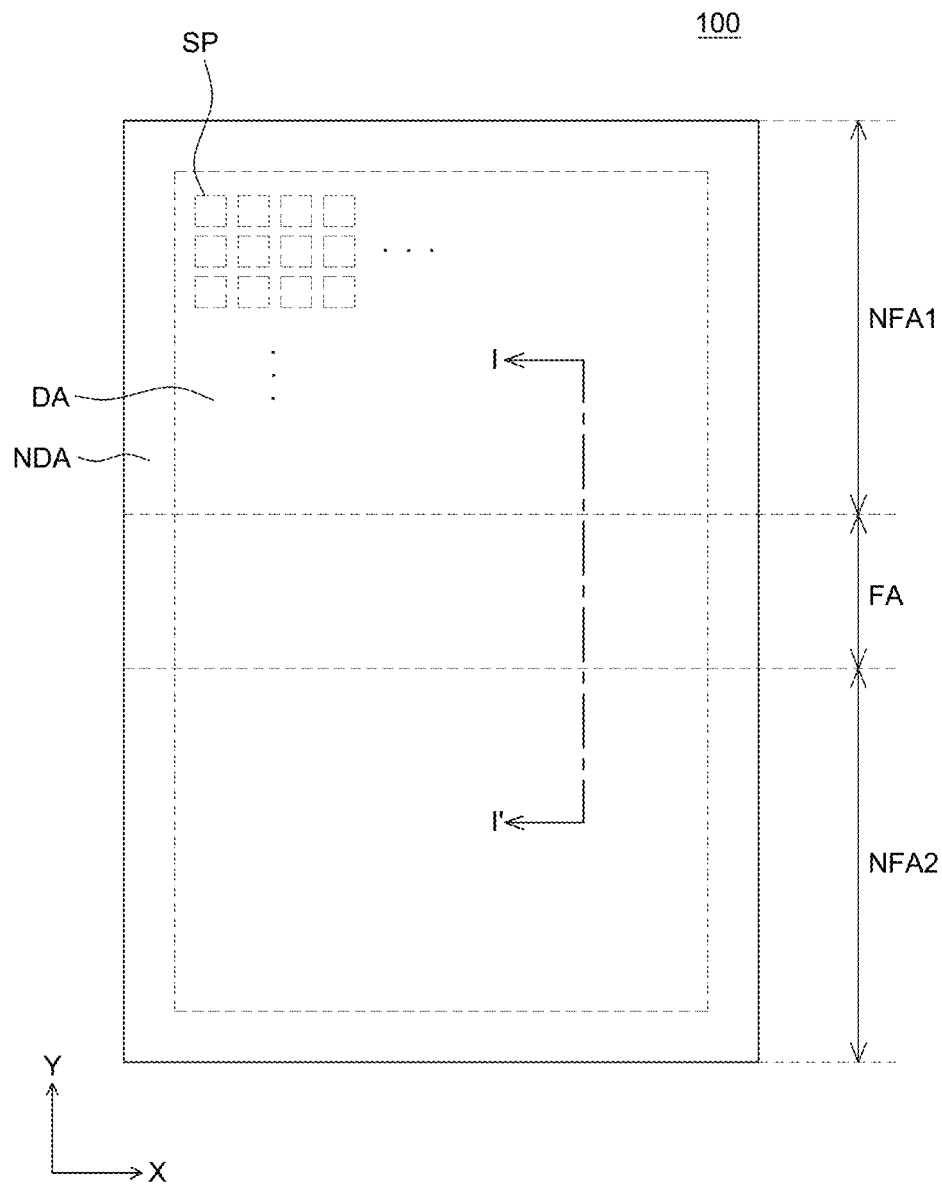
FIG. 1 is a schematic plan view of a flexible display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a flexible display device according to exemplary embodiments of the present disclosure will be described in detail with reference to accompanying drawings.

Figure 2:
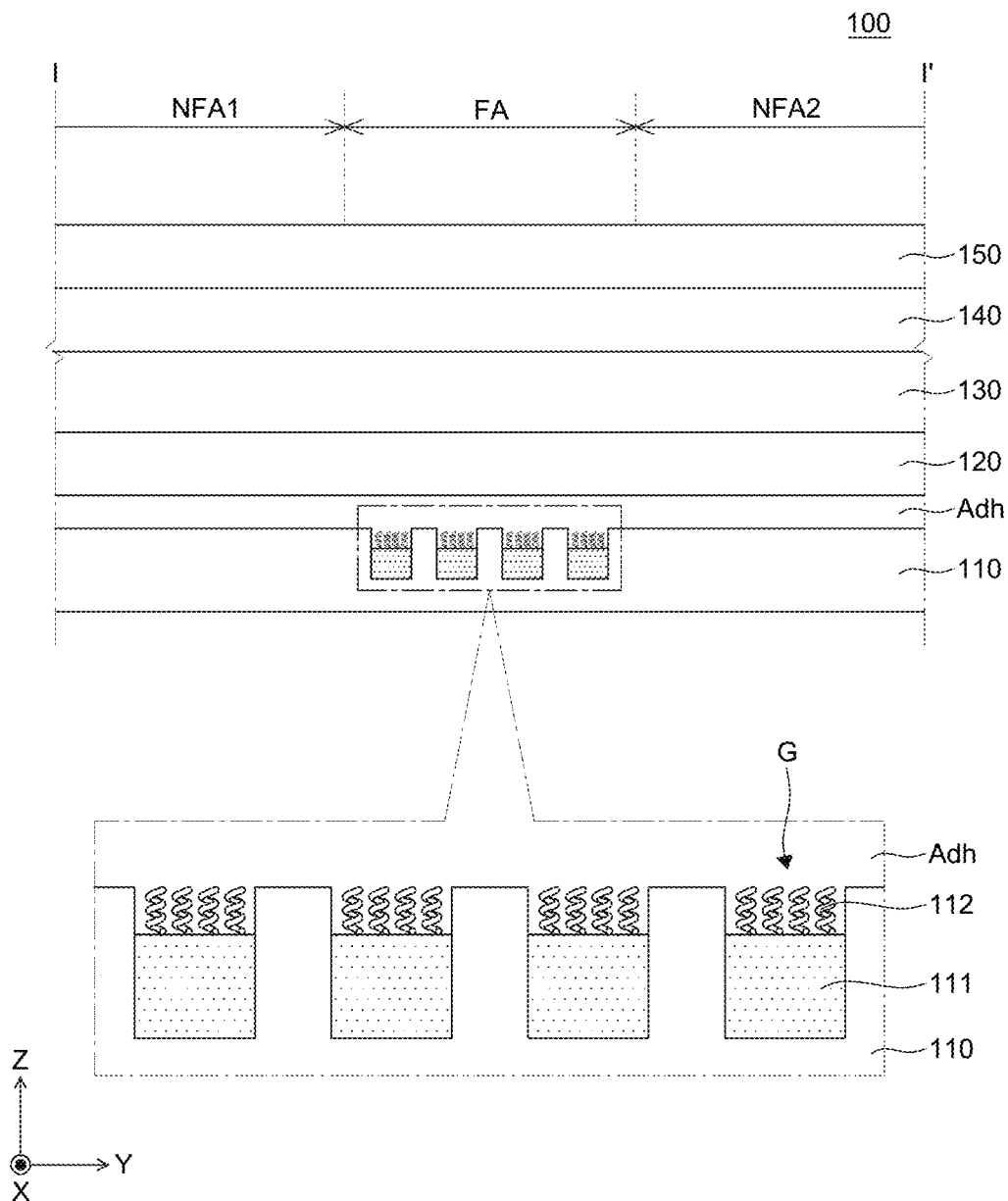
FIG. 2 is a schematic cross-sectional view taken along the line I-I of FIG. 1.
Figure 3:
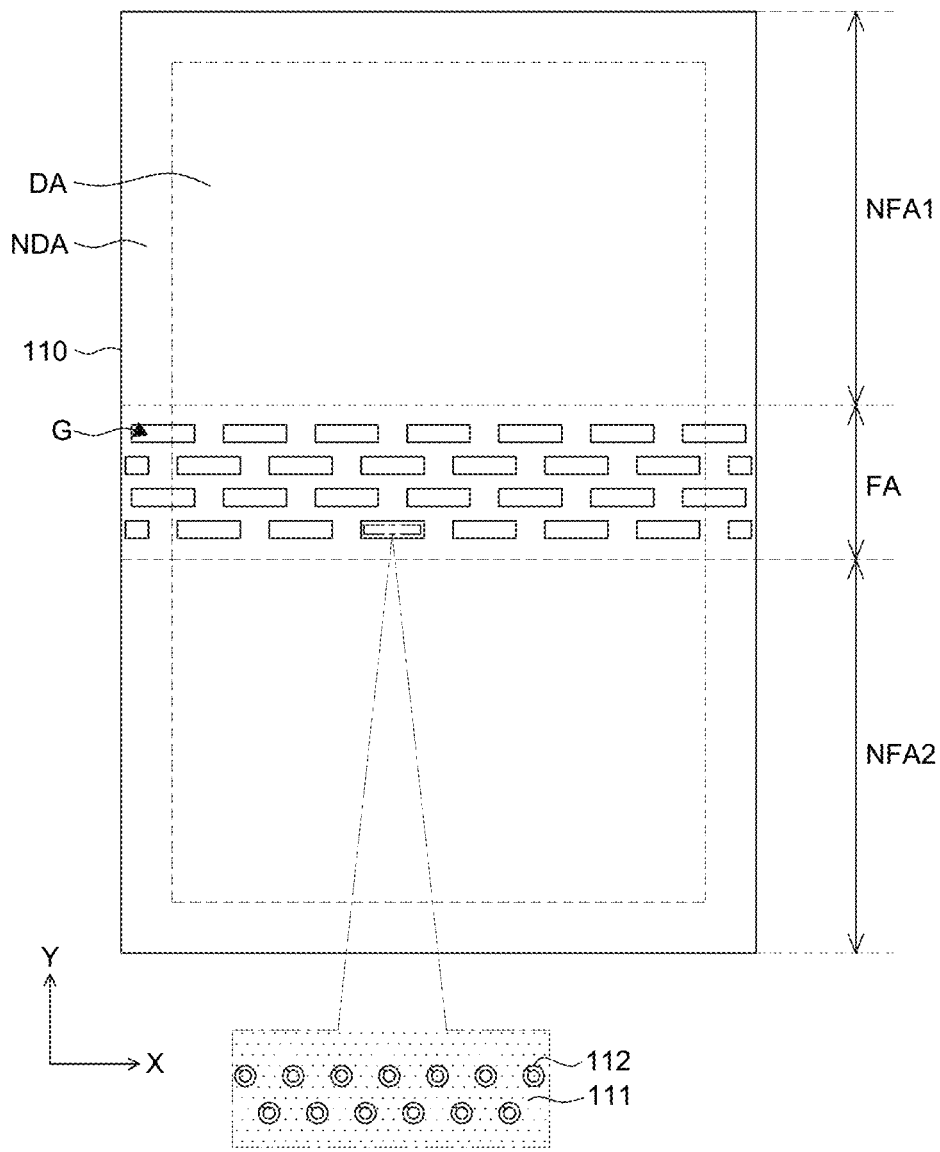
FIG. 3 is a schematic plan view of a bottom plate in a flexible display device according to an exemplary embodiment of the present disclosure.

FIG. 1 is a schematic plan view of a flexible display device according to an exemplary embodiment of the present disclosure. FIG. 2 is a schematic cross-sectional view taken along the line I-I of FIG. 1. FIG. 3 is a schematic plan view of a bottom plate in a flexible display device according to an exemplary embodiment of the present disclosure.

Referring to FIGS. 1 and 3, the flexible display device 100 according to the exemplary embodiment of the present disclosure includes a bottom plate 110, an adhesive layer Adh, a back plate 120, a display panel 130, an optical control layer 140, and a cover member 150. Hereinafter, for the convenience of description, the description will be made by assuming that the flexible display device according to the exemplary embodiment of the present disclosure is an organic light emitting display device, but it is not limited thereto.

The display panel 130 includes a display area DA and a non-display area NDA. Further, the display panel includes a folding area FA and non-folding areas NFA1 and NFA2. The display panel 130 may be divided into the display area DA and the non-display area NDA depending on whether to display images and may be divided into a folding area FA and a non-folding area NFA depending on whether to be foldable. Therefore, a partial area of the display panel 130 may be a display area DA and a folding area FA and the other partial area of the display panel 130 may be a non-display area NDA and the non-folding area NFA.

The display area DA is an area where a plurality of pixels is disposed to substantially display images. In the display area DA, a plurality of pixels which includes an emission area to display images, a thin film transistor for driving the pixels, and a capacitor may be disposed. One pixel may include a plurality of sub pixels SP. The sub pixel SP is a minimum unit which configures the display area and each sub pixel SP may be configured to emit light of a specific wavelength band. For example, each of the sub pixels SP may be configured to emit red light, green light, blue light, or white light.

The non-display area NDA is disposed so as to enclose the display area DA. The non-display area NDA is an area where images are not substantially displayed and various wiring lines and driving ICs for driving the pixels and the driving elements disposed in the display area DA are disposed therein.

As described above, the display panel 130 may be defined as a folding area FA and non-folding areas NFA1 and NFA2 depending on whether to be foldable. The display panel 130 includes one folding area FA which is foldable and non-folding areas NFA1 and NFA2 excluding the folding area. The folding area FA is an area which is folded when the flexible display device 100 is folded and is folded in accordance with a specific radius of curvature with respect to a folding axis. For example, the folding axis of the folding area FA may be formed in an X-axis direction and the non-folding areas NFA1 and NFA2 may extend from the folding area FA in a Y-axis direction which is perpendicular to the folding axis. When the folding area FA is folded with respect to the folding axis, the folding area FA may form a part of a circle or an oval. At this time, a radius of curvature of the folding area FA may refer to a radius of a circle or an oval formed by the folding area FA.

The non-folding areas NFA1 and NFA2 are areas which are not folded when the flexible display device 100 is folded. That is, the non-folding areas NFA1 and NFA2 maintain a flat state when the flexible display device 100 is folded. The non-folding areas NFA1 and NFA2 may be located on both sides of the folding area FA. That is, the non-folding areas NFA1 and NFA2 may be areas extending to the Y-axis direction with respect to the folding axis. At this time, the folding area FA may be defined between the non-folding areas NFA1 and NFA2. Further, when the flexible display device 100 is folded with respect to the folding axis, the non-folding areas NFA1 and NFA2 may overlap each other.

The display panel 130 may include a flexible substrate and a display element.

The flexible substrate supports various elements which configure the display panel 130. The flexible substrate may be a plastic substrate having a flexibility. For example, the plastic substrate may be a polymer material selected from polyimide, polyamide imide, polyethersulfone, polyethylene terephthalate, and polycarbonate, but is not limited thereto.

A driving thin film transistor for driving the display element may be disposed on the flexible substrate. The driving thin film transistor may be disposed in each of the plurality of pixel areas. For example, the driving thin film transistor includes a gate electrode, an active layer, a source electrode, and a drain electrode. The driving thin film transistor may further include a gate insulating layer which insulates the gate electrode from the active layer and an interlayer insulating layer which insulates the gate electrode from the source electrode and the drain electrode.

A planarization layer may be disposed on the driving thin film transistor to planarize the upper surface and the display element is disposed on the planarization layer. The display element may be an organic light emitting diode. The organic light emitting diode may include an anode, a cathode, and an organic light emitting layer disposed therebetween. In the organic light emitting diode, holes injected from the anode and electrons injected from the cathode are coupled on the organic light emitting layer to emit light. The image may be displayed using the light emitted as described above.

The optical control layer 140 may be disposed on the display element. The optical control layer 140 uniformly transmits light emitted from the display panel 130 without degrading the luminance to improve a light emission efficiency. Further, the optical control layer 140 absorbs external light to minimize the degradation of the visibility and the contrast ratio due to the external light reflection. For example, the optical control layer 140 may be a polarizing film, but is not limited thereto.

The cover member 150 is disposed on the optical control layer 140. The cover member 150 protects the display panel 130 from the external impact and scratches. Therefore, the cover member 150 may be formed of a material which is transparent and has excellent impact resistance and scratch resistance. Further, the cover member 150 protects the display panel 130 from the moisture or foreign materials permeating from the outside.

For example, the cover member 150 may be a film formed of a polymer, such as polyimide, polyamide imide, polyethylene terephthalate, polymethyl methacrylate, polypropylene glycol, and polycarbonate. A decoration film is disposed below the cover member 150 or a decoration pattern may be formed on a lower surface of the cover member 150 to correspond to the non-display area. The decoration film or the decoration pattern does not allow the components, such as a wiring line disposed in the non-display area NDA, to be visible to the outside. Further, the decoration film or the decoration pattern also serves to suppress the light leakage through the side surface of the flexible display device 100.

When the flexible display device 100 is folded or bent, the display panel 130 having a flexibility may have a difficulty to maintain a predetermined shape and may be vulnerable to external stimulus. Accordingly, various types of supporting members may be disposed on the rear surface of the display panel 130. For example, a back plate 120 and a bottom plate 110 may be disposed on the rear surface of the display panel 130.

A thickness of a plastic flexible substrate is small so that the display panel 130 may be sagged during the folding or bending and in order to supplement for this, the back plate 120 may be disposed on the rear surface of the display panel 130.

The back plate 120 may be formed of the plastic material so as to support the flexible substrate and maintain the foldability to be high. For example, the back plate 120 may be selected from a polyethylene terephthalate film, polycarbonate, a polyimide film or a polyamideimide film, but is not limited thereto. As another example, the back plate 120 may be a metal foil which is foldable and has an excellent rigidity. For example, the back plate 120 may be a metal foil including a metal such as stainless steel (SUS), invar, aluminum or magnesium, but is not limited thereto.

The bottom plate 110 is disposed below the back plate 120 to supplement the rigidity of the flexible substrate and the back plate 120. For example, the bottom plate 110 may be formed of a metal material such as stainless steel (SUS), invar, aluminum, or magnesium. Such a metal material has a higher strength than the plastic material so that the durability of the flexible display device 100 may be further improved. Further, when the bottom plate is formed of a metal material, it is advantages in that the thickness is maintained to be thinner than that of the plastic material to be foldable and the rigidity and the impact resistance are ensured.

The bottom plate 110 includes a plurality of grooves G. The plurality of grooves G may be formed on an upper surface of the bottom plate 110 so as to correspond to the folding area FA. That is, the plurality of grooves G is recessed toward the lower surface from the upper surface of the bottom plate 110. When the flexible display device 100 is folded, the stress is concentrated on the folding area FA. The plurality of grooves G may disperse the stress concentrated on the folding area FA during the folding. As described above, as the plurality of grooves G is formed in a position corresponding to the folding area FA, it is advantageous in that the flexible display device 100 has an excellent foldability and reliability.

Each of the plurality of grooves G may be formed to extend along a direction parallel to the folding axis to be long. That is, each of the plurality of grooves G may be formed to extend along the X-axis direction which is the same as the folding axis. Accordingly, each of the plurality of grooves G may be formed to be parallel to the folding axis with a bar shape on the plan view. That is, each of the plurality of grooves G has a major axis in the X-axis direction which is the same as the folding axis and has a miner axis in the Y-axis direction perpendicular to the X-axis direction. In this case, the rigidity is increased along the major axis and the flexibility is increased along the minor axis so that it is advantageous to ensure the foldability.

Referring to FIG. 3, the plurality of grooves G is spaced apart from each other with a specific interval to be formed as islands on the plan view. When the plurality of grooves G is spaced apart from each other as an island without extending along the folding axis, the stretchability may be maintained to be high. Even though in FIGS. 2 and 3, for the convenience of description, it is illustrated that the plurality of grooves is formed in four rows, it is not limited thereto. Further, the plurality of grooves G formed with an island structure may be disposed with a zigzag pattern and in this case, the folding stress is further reduced and it is advantageous to ensure the reliability.

If necessary, optionally, each of the plurality of grooves G may continuously extend to the non-display area across the display area DA without being disconnected, along the X-axis direction which is the same as the folding axis.

Even though in the drawing, the cross-sectional shape of each of the plurality of grooves G is a rectangular, is not limited thereto. The cross-sectional shape of each of the plurality of grooves G may be formed with various shapes such as a polygonal shape other than a semi-circular shape or a quadrangular shape.

In the related art, in order to disperse the folding stress concentrated on the folding area, opening patterns, that is, a plurality of holes is formed on the bottom plate. In this case, the folding stress is dispersed to satisfy the folding reliability, but the visibility of the opening pattern is increased so that the appearance quality is deteriorated.

The flexible display device 100 according to the exemplary embodiment of the present disclosure forms grooves on the upper surface of the bottom plate 110 so that the visibility of the pattern is reduced to improve the appearance quality. That is, the plurality of grooves G is formed with a predetermined depth from the upper surface of the bottom plate 110 in a thickness direction (a Z-axis) of the bottom plate 110. Therefore, the recognition of the plurality of grooves G formed in the folding area FA by the user is reduced so that the appearance quality may be improved.

The plurality of grooves G may be formed by removing a part of a material which forms the bottom plate 110. For example, the plurality of grooves G may be formed by a known method such as photolithography, laser etching, or plasma etching, but is not limited thereto.

A filler 111 is filled in each of the plurality of grooves G.

When the plurality of grooves G is formed in the bottom plate 110 which overlaps the folding area FA, the stress during the folding is dispersed so that the foldability is improved. However, a step is formed so that the flatness is degraded. Accordingly, problems such as separation or cracks of the components are caused due to the stress irregularity during the folding so that the folding reliability is not satisfied and it is restricted to implement a flexible display device having a larger curvature. Further, when the flatness of the folding area FA is degraded, the distortion of the image which is displayed in the folding area FA is caused to deteriorate the display quality.

Therefore, the plurality of grooves G is filled with the filler 111 to reduce the step and reduce the degradation of the flatness. At least a part of each of the plurality of grooves G is filled with the filler 111. A thickness of the filler 111 which is filled in the plurality of grooves G may be adjusted as needed. For example, in order to reduce the visibility of the step and the groove pattern and maintain the folding reliability to be high, the filler 111 is filled in the plurality of grooves G to be equal to or higher than 0.5 times the depth of each of the plurality of grooves, but is not limited thereto.

For example, the filler 111 may be a soft polymer or a solder material.

For example, the filler 111 is a polymer which is curable by heat or UV light and is selected from an acrylic resin, a urethane resin, and a silicon resin, but is not limited thereto.

For example, the solder material may be formed from a liquid solder or a solder paste in which conductive particles are uniformly dispersed in the binder resin. For example, the binder resin may be selected from an epoxy-based resin, a urethane-based resin, an acrylic resin, a silicone-based resin, a phenol-based resin, a melamine-based resin, an alkyd-based resin, a urea resin, and an unsaturated polyester resin. For example, the conductive particles may be selected from an alloy of tin and one or more metals selected from silver, copper, lead, bismuth, zinc, and indium.

Referring to FIG. 3, a plurality of nano helix structures 112 is disposed on the filler 111. The nano helix structure 112 minimizes the degradation of the flatness by filling the step caused by the plurality of grooves G without degrading the foldability so that the plurality of groove (G) patterns is not visible from the outside of the flexible display device 100. Therefore, the appearance quality of the flexible display device will be improved.

The nano helix structure 112 has a spring or coil shape and has a complex shape as compared with another three-dimensional nano structure such as a nano rod, a nano wire, or a nano tube. The nano helix structure is disposed on the filler 111 so that the recognition of the plurality of grooves G formed on the bottom plate 110 from the outside of the flexible display device 100 may be more effectively reduced.

The plurality of nano helix structures 112 is disposed on the filler 111 so as to correspond to each of the plurality of grooves G. The plurality of nano helix structures 112 is disposed in each of the plurality of grooves G. Each of the plurality of nano helix structures 112 is disposed toward the thickness direction of the bottom plate 110, that is, the Z-axis direction from the upper surface of the filler 111. Accordingly, each of the plurality of nano helix structures 112 is disposed so as to be directed to the lower surface of the back plate 120 from the upper surface of the filler 111.

Referring to FIGS. 2 and 3, the nano helix structures 112 are disposed on the filler 111 which is filled in each of the plurality of grooves G with a zigzag pattern. That is, the plurality of nano helix structures 112 is disposed on the filler 111 filled in each of the plurality of grooves G with a zigzag pattern in the X-axis direction and the Y-axis direction. As described above, when the plurality of nano helix structures 112 is disposed with a zigzag pattern, the step filling effect is maximized while maintaining a high foldability to minimize the recognition of the groove pattern, but is not limited thereto. If a degree of recognizing the plurality of groove (G) patterns is not so high, the plurality of nano helix structures 112 may be randomly disposed or regularly disposed in a line.

Figure 4:
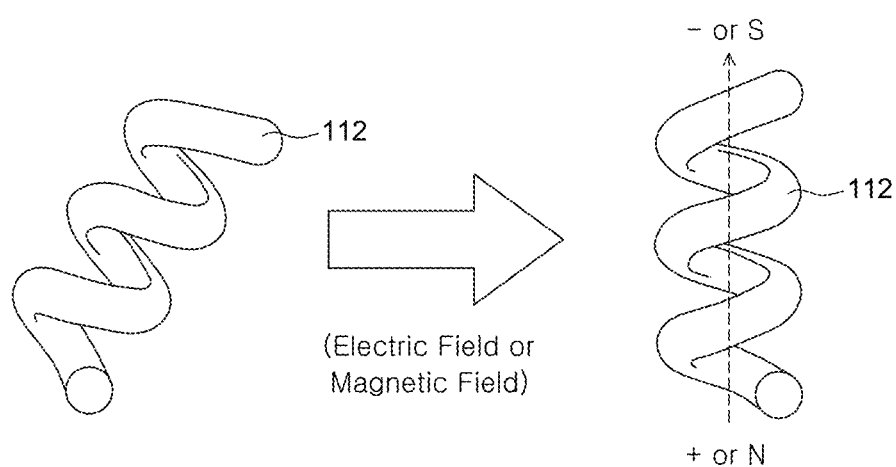
FIG. 4 is a view for explaining a characteristic of the nano helix structures which are aligned by a magnetic field or an electric field.
Figure 5A:
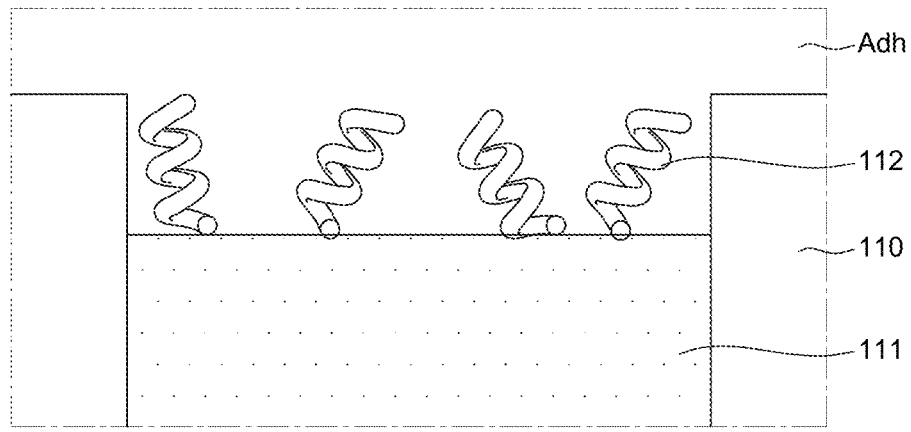
FIG. 5A is an enlarged cross-sectional view illustrating a state in which an alignment of nano helix structures is deformed.
Figure 5B:
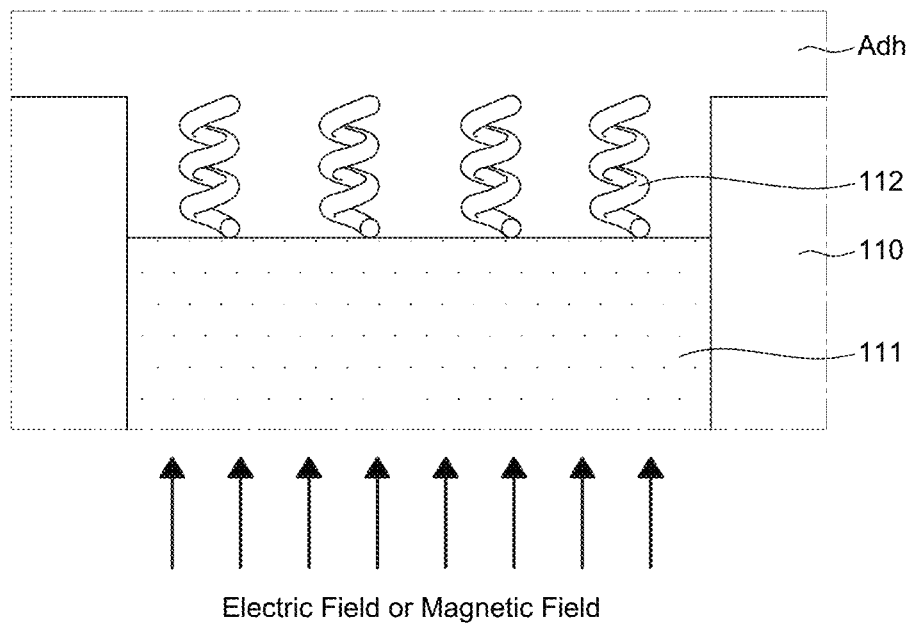
FIG. 5B is an enlarged cross-sectional view illustrating a state in which an alignment of nano helix structures is restored.
Figure 6:
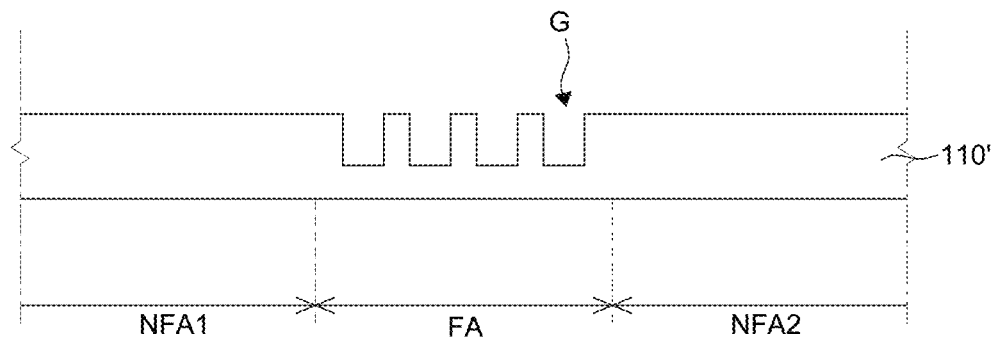
FIGS. 6 to 9 are schematic cross-sectional process views for explaining a manufacturing method of a bottom plate in a flexible display device according to an exemplary embodiment of the present disclosure.
Figure 7:
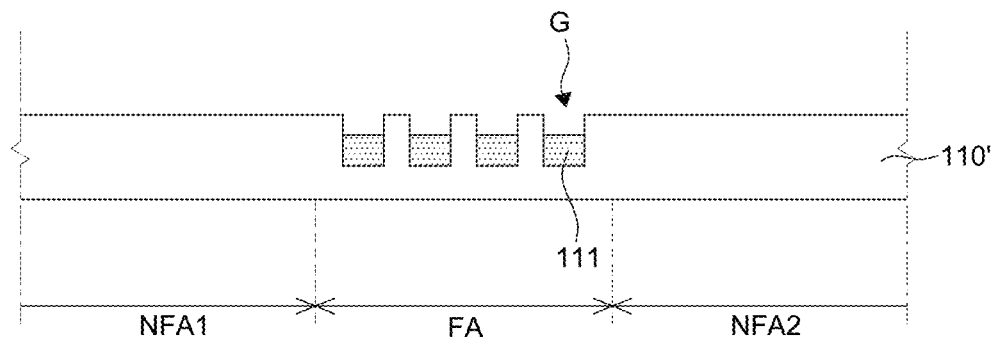

Unlike the general nano structures, the nano helix structure has a characteristic that when a magnetic field or an electric field is applied, the nano helix structure is aligned in a regular direction. Accordingly, the plurality of nano helix structures 112 is regularly aligned in the thickness direction (Z-axis direction) of the bottom plate 110. Hereinafter, a physical property of the nano helix structure 112 will be described in detail with reference to FIGS. 4, 5A, and 5B. FIG. 4 is a view for explaining a characteristic of the nano helix structures which are aligned by a magnetic field or an electric field. FIG. 5A is an enlarged cross-sectional view illustrating a state in which an alignment of nano helix structures is deformed. FIG. 5B is an enlarged cross-sectional view illustrating a state in which an alignment of nano helix structures is restored.

Referring to FIG. 4, when a magnetic field or an electric field is applied, the nano helix structures 112 are regularly aligned in a single direction. When a magnetic field or an electric field is applied, the nano helix structures 112 are aligned in the applied electric field or magnetic field. For example, when the magnetic field is applied to the nano helix structures 112, the nano helix structures are aligned from the N pole to the S pole. As another example, an electric field is applied to the nano helix structures 112, the nano helix structures 112 are aligned in a direction from a positive terminal (+) to a negative terminal (−).

Even though the regular alignment of the nano helix structures 112 is disordered by the external environment, if an electric field or a magnetic field is applied, the nano helix structures are regularly disposed again. Referring to FIG. 5A, the plurality of nano helix structures 112 regularly disposed in each of the plurality of grooves G may be disordered when the flexible display device 100 is used. In this case, when a magnetic field is applied from the outside by wireless charging, as illustrated in FIG. 5B, the plurality of nano helix structures 112 may be regularly aligned. That is, as the flexible display device 100 is used, even though the nano helix structures 112 are disordered, the alignment is restored by the external magnetic field. Accordingly, the appearance quality is consistently maintained to be high.

For example, the nano helix structure 112 may include one or more materials selected from zinc oxide, magnesium oxide, and carbon nano tube, but is not limited thereto. Among them, the zinc oxide is easy to be manufactured as the nano helix structure 112 and has an excellent degree of dispersion. Further, the zinc oxide nano-helix structure 112 has advantages in that the reactivity to an external magnetic field is excellent and the restoring force of the alignment is also excellent. For reference, even though the nano helix structure 112 including magnesium oxide may reduce a visibility of the groove pattern, a ratio of defects is relatively high when the nano helix structure 112 is manufactured so that a magnetic susceptibility is relatively low. Even though the nano helix structure 112 including carbon nano tube may reduce a visibility of the groove pattern and a ratio of defects is relatively low when the nano helix structure 112 is manufactured, a magnetic susceptibility and a degree of dispersion are relatively low. Accordingly, in order to easily align the nano helix structure 112, reduce the visibility of the pattern, and maintain the appearance quality to be high for a long term, the nano helix structure 112 including zinc oxide may be most desirable.

For example, an average length of the nano helix structure 112 may be 3 μm to 13 μm, and desirably, 7 μm to 10 μm. In this case, it is susceptible to the external magnetic field so that it is easy to regularly align the nano helix structures 112 and when the alignment is deformed, the restoring force is also excellent. Accordingly, the visibility of the groove pattern is further reduced and the appearance quality is further improved.

For example, the nano helix structure 112 may be manufactured by various known methods such as a melt spinning method, a method of growing a nano helix structure 112 on a substrate, and a manufacturing method using a template. Desirably, the nano helix structure 112 may be manufactured by the melt spinning method, which has advantages in that it is easy to control a thickness or a length of the nano helix structure 112 and the mass production is possible. Specifically, the melting spinning method is performed by melting, spinning, and cooling materials such as zinc oxide, magnesium oxide, and carbon nano tube. The spun nano structure has a wire shape. If the spun nano structure is rapidly cooled, the spun nano structure is rolled into a spring form so that the nano helix structure is obtained. At this time, a rotation speed of a wheel from which the material is spun, a cooling speed, and a rotation radius of the wheel are controlled to obtain desired thickness and length.

For example, a weight ratio of the filler 111 to the nano helix structure 112 included in each of the plurality of grooves G may be 90:10 to 99:1. Desirably, a weight ratio of the filler 111 to the nano helix structure 112 included in each of the plurality of grooves G may be 97:3 to 93:7 or 96:4 to 93:7. Within this range, as the nano helix structure 112 is included, the effect of reducing the visibility of the groove pattern is more excellent and the restoring force is also excellent so that the appearance quality is excellent.

The adhesive layer Adh is disposed between the bottom plate 110 and the back plate 120. The adhesive layer Adh bonds the bottom plate 110 and the back plate 120. Further, the adhesive layer Adh is filled in an empty space of the plurality of grooves G to be filled in the step. Accordingly, the adhesive layer Adh is disposed to be in direct contact with the filler 111 and the plurality of nano helix structures 112. The adhesive layer Adh may be selected from an optical clear adhesive (OCA), an optical clear resin (OCR), and a pressure sensitive adhesive (PSA), but is not limited thereto.

In order to ensure the foldability, a low modulus adhesive is used to form the adhesive layer. In this case, there is a problem in that the plurality of groove patterns is more seriously visible from the outside of the flexible display device. According to the exemplary embodiment of the present disclosure, in each of the plurality of grooves G, the filler 111 and the plurality of nano helix structures 112 are disposed so that even though the adhesive layer Adh is formed with the low modulus adhesive, the recognition of the plurality of groove (G) patterns is minimized. Accordingly, according to the exemplary embodiment of the present disclosure, the flexible display device 100 with the excellent foldability and reliability and the excellent appearance quality may be provided.

Hereinafter, a method of manufacturing a bottom plate according to an exemplary embodiment of the present invention will be described with reference to FIGS. 6 to 9. FIGS. 6 to 9 are schematic cross-sectional process views for explaining a manufacturing method of a bottom plate in a flexible display device according to an exemplary embodiment of the present disclosure.

First, a bottom plate 110' is prepared and a plurality of grooves G is formed in an area corresponding to a folding area FA. As described above, the plurality of grooves G may be formed by a method selected from photolithographic, laser etching, and plasma etching processes.

Next, each of the plurality of grooves G is filled with the filler 111. Specifically, a mask on which an opening pattern corresponding to the plurality of grooves G is formed is covered on the bottom plate 110' and the filler 111 is filled in the plurality of grooves G and cured. For example, the filler 111 may be a polymer, a liquid solder, or a solder paste which is cured by heat or light. As another example, the filler 111 may be formed by a micro spot soldering process which locally applies a liquid solder or a solder paste in a selected area.

Next, a magnetic field or an electric field is applied to a magnetic reactive film 190 including a plurality of protrusions 191 to attach the nano helix structure 112 to each of the plurality of protrusions 191. The plurality of nano helix structures 112 which is manufactured by the melt-spinning method is randomly aligned and has an electromagnetic connectivity. Accordingly, in order to dispose the plurality of nano helix structures 112 in a specific area to have a regular alignment, the magnetic reactive film 190 is used. The magnetic reactive film 190 includes a plurality of protrusions 191. When the electric field or the magnetic field is applied to the magnetic reactive film 190, the nano helix structure 112 is attached to each protrusion 191 by the electromagnetic interaction.

Figure 8:
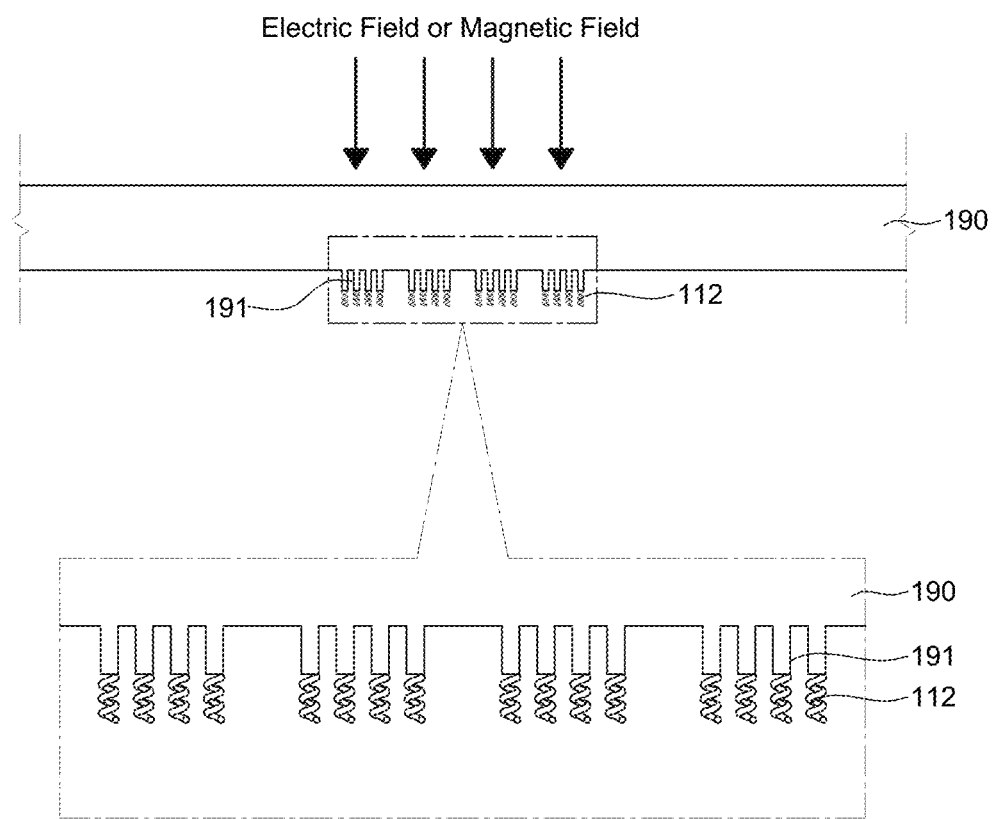
Figure 9:
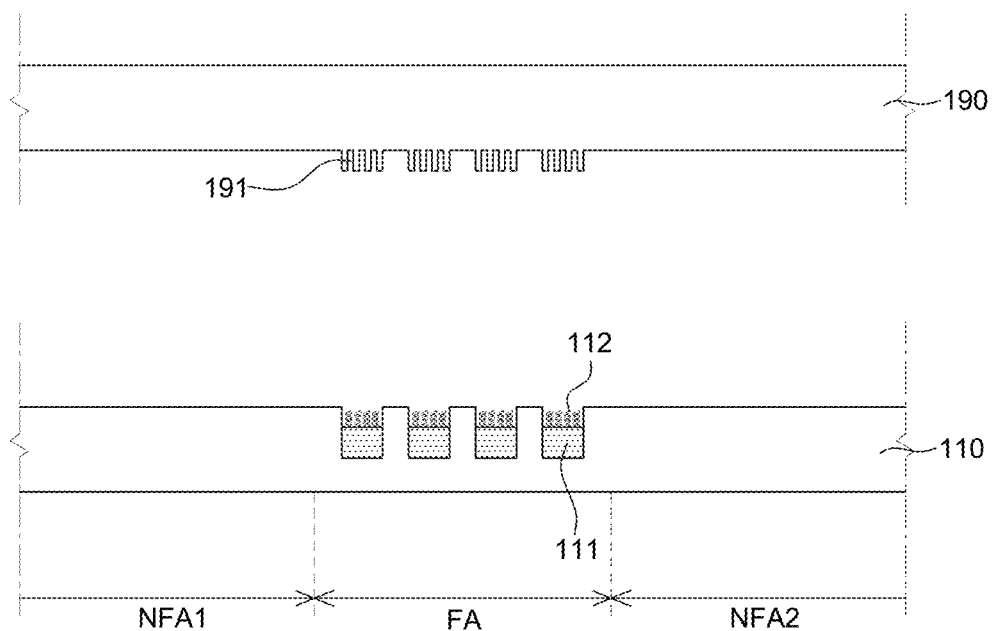

The magnetic reactive film 190 is a film including a magnetic material. For example, the magnetic reactive film 190 may be a plastic film in which Fe-based magnetic particles are dispersed. Specifically, the magnetic reactive film 190 may be a polysiloxane based film in which carbonyl iron particles are dispersed. The carbonyl iron is a magnetic material so that the magnetic reactive film 190 including the carbonyl iron has a magnetic reactivity. When the magnetic field is not applied from the outside, the protrusion 191 does not protrude from the surface of the magnetic reactive film 190, but is folded to be in contact with the magnetic reactive film 190. When the magnetic field is applied to the magnetic reactive film 190, an electric dipole is formed at an end of the protrusion 191 so that as illustrated in FIG. 8, the protrusion 191 is deformed in an upright structure perpendicular to the surface of the magnetic reactive film 190, as the same direction as the applied magnetic field. The nano helix structure 112 is attached to each of the protrusion 191 of the magnetic reactive film 190 by an induced magnetic field between the electric dipole formed in the protrusion 191 and the nano helix structure 112.

Next, the nano helix structure 112 attached to each of the plurality of protrusions 191 is transferred onto the filler 111. After placing the magnetic reactive film 190 attached with the nano helix structure 112 on the bottom plate 110, the nano helix structure 112 attached to the plurality of protrusions 191 is transferred onto the filler 111. When the magnetic field applied to the magnetic reactive film 190 is removed after disposing the magnetic reactive film 190 attached with the nano helix structure 112 in a desired position, the nano helix structure 112 is transferred onto the filler 111.

At this time, in order to minimize the recognition of the plurality of grooves G from the outside of the flexible display device 100, the nano helix structure 112 may be transferred onto the filler 111 filled in each of the plurality of grooves G to be disposed with a zigzag pattern. In the meantime, the nano helix structure 112 is disposed on the filler 111 by selectively attaching and transferring the nano helix structure 112 in the protrusion 191 formed on the magnetic reactive film 190. Accordingly, the distribution and the shape of the protrusions 191 formed in the magnetic reactive film 190 may be formed to correspond to a desired alignment of the nano helix structure 112.

Next, the electric field or the magnetic field is applied to the bottom plate 110, the nano helix structures 112 are aligned in a single direction. As described above with reference to FIG. 4, the nano helix structures 112 have a characteristic of being aligned in a single direction when the electric field or the magnetic field is applied. Accordingly, after transferring the nano helix structures 112 onto the filler 111, the electric field or the magnetic field is applied in the thickness direction of the bottom plate 110 to align the plurality of nano helix structures in the thickness direction of the bottom plate 110. After transferring the nano helix structures 112 onto the filler 111 using the magnetic reactive film 190, if the nano helix structures 112 maintain a sufficiently regularly aligned state, this step may be omitted.

The bottom plate 110 manufactured as described above has an advantage of an excellent appearance quality because the filler 111 and the plurality of nano helix structures 112 are filled in the plurality of grooves G. Therefore, the shape of the plurality of grooves G formed in the bottom plate 110 is not visible to the user while maintaining the foldability and the reliability of the flexible display device 100 to be high.

Hereinafter, the effects of the present disclosure will be described in more detail with reference to Examples and Comparative Examples. However, the following Examples are set forth to illustrate the present disclosure, but the scope of the disclosure is not limited thereto.

Example 1

Figure 10:
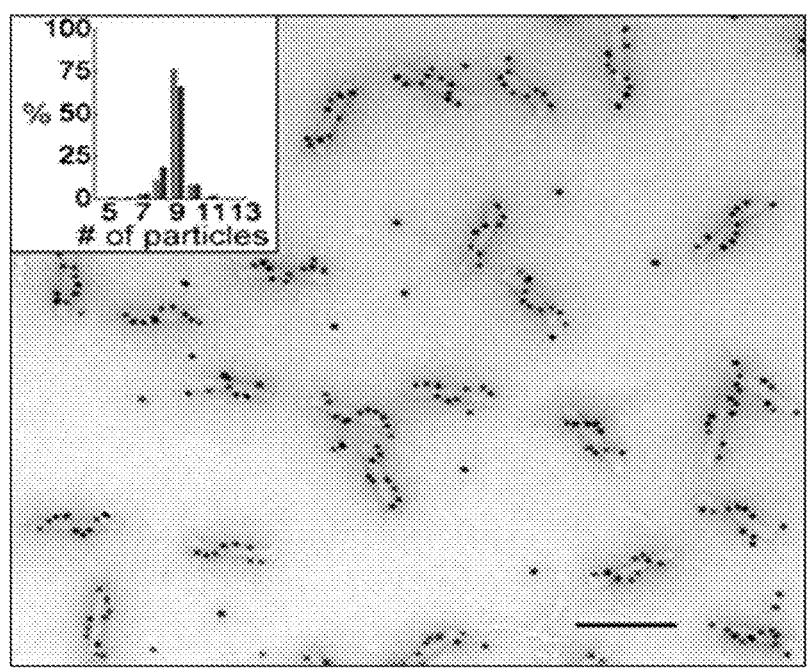
FIG. 10 is an SEM image of a surface of a filler in a bottom plate according to Example 1.

A plurality of grooves was formed in a metal bottom plate. A silicon based resin was filled in each of the plurality of grooves. A zinc oxide nano helix structure (an average length of 9 μm) was transferred onto the filler using a magnetic reactive film. At this time, a weight ratio of the filler and the nano helix structure was controlled to be 98:2. FIG. 10 is an SEM image illustrating a zinc oxide nano helix structure transferred onto a surface of the filler on a bottom plate according to Example 1. Referring to FIG. 10, it was confirmed that the zinc oxide nano helix structures were uniformly transferred onto a surface of the filler. Next, an electric field was applied in a thickness direction of the metal bottom plate to align the nano helix structures in the thickness direction of the metal bottom plate. The bottom plate with the structure as illustrated in FIGS. 2 and 3 was manufactured by means of this process.

Example 2

The bottom plate was manufactured by the same method as Example 1 except that a weight ratio of the filler and the nano helix structure was changed to 96:4.

Example 3

The bottom plate was manufactured by the same method as Example 1 except that a weight ratio of the filler and the nano helix structure was changed to 94:6.

Example 4

The bottom plate was manufactured by the same method as Example 1 except that a weight ratio of the filler and the nano helix structure was changed to 92:8.

Example 5

The bottom plate was manufactured by the same method as Example 1 except that a zinc oxide nano helix structure having an average length of 5 μm was used.

Example 6

The bottom plate was manufactured by the same method as Example 1 except that a zinc oxide nano helix structure having an average length of 11 μm was used.

Comparative Example 1

The bottom plate was manufactured by the same method as Example 1 except that the nano helix structure was not disposed on the filler. That is, the bottom plate according to Comparative Example 1 was formed such that only the filler was filled in each of the plurality of grooves.

Comparative Example 2

The bottom plate was manufactured by the same method as Example 1 except that a silicon based resin in which silver (Ag) nano particles (a diameter was 100 nm to 200 nm) were dispersed was filled in each of the plurality of grooves and the nano helix structure was not aligned on the filler. At this time, a weight ratio of the silicon based resin and the silver nano particles was controlled to be 98:2.

Comparative Example 3

The bottom plate was manufactured by the same method as Example 1 except that a silicon based resin in which silver (Ag) nano wires (a length was 300 nm to 500 nm) were dispersed was filled in each of the plurality of grooves and the nano helix structure was not aligned on the filler. At this time, a weight ratio of the silicon based resin and the silver nano wires was controlled to be 98:2.

Experimental Example 1

A visibility of the patterns of the bottom plates prepared according to Example 1 and Comparative Examples 1 to 3 to the user was evaluated. The visibility of the pattern was evaluated by preparing a specimen by laminating a display panel on the bottom plate, optically obtaining a contour graph for a surface of the display panel using Optimap surface analysis equipment, and then measuring a height deviation therefrom. The higher the height deviation, the larger the visibility of the pattern.

The result was represented in Table 1 and FIGS. 11 to 14.

Figure 11:
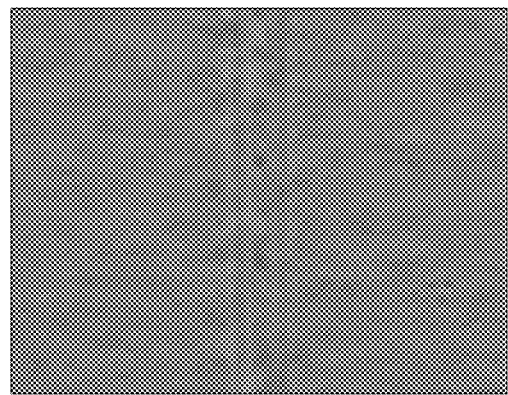
FIG. 11 is a photograph illustrating a visibility of a groove pattern of a bottom plate according to Example 1.
Figure 12:
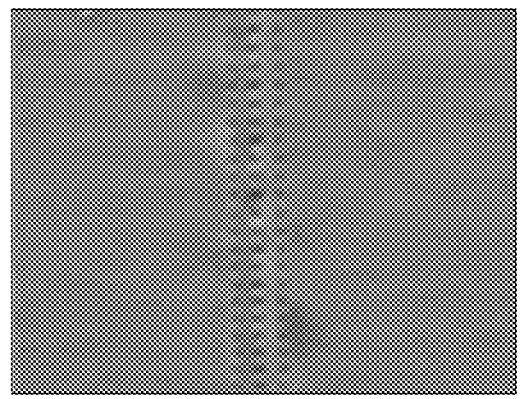
FIG. 12 is a photograph illustrating a visibility of a groove pattern of a bottom plate according to Comparative Example 1.
Figure 13:
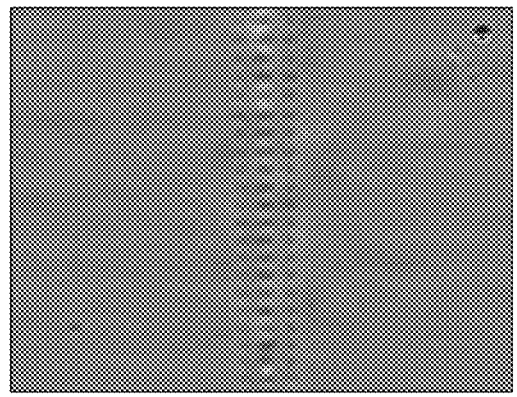
FIG. 13 is a photograph illustrating a visibility of a groove pattern of a bottom plate according to Comparative Example 2.
Figure 14:
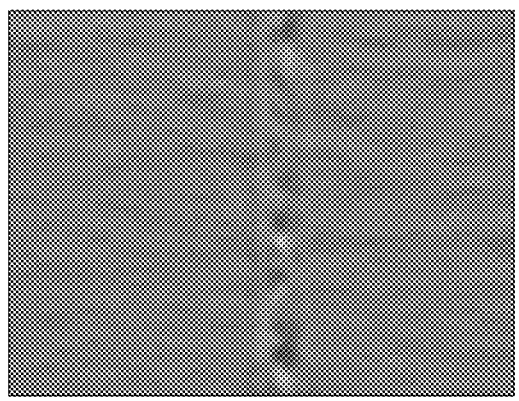
FIG. 14 is a photograph illustrating a visibility of a groove pattern of a bottom plate according to Comparative Example 3.

FIG. 11 is a photograph illustrating a visibility of a groove pattern of a bottom plate according to Example 1 and FIG. 12 is a photograph illustrating a visibility of a groove pattern of a bottom plate according to Comparative Example 1. FIG. 13 is a photograph illustrating a visibility of a groove pattern of a bottom plate according to Comparative Example 2 and FIG. 14 is a photograph illustrating a visibility of a groove pattern of a bottom plate according to Comparative Example 3. In Table, a degree of recognizing a pattern of the bottom plate is represented by numerical values and it means that the larger the numerical value, the lower the appearance quality.

TABLE 1

|  | Comp. Ex. 1 | Comp. Ex. 2 | Comp. Ex. 3 | Example 1 |
|---|---|---|---|---|
| Visibility of pattern | 1.77 | 1.45 | 1.41 | 0.94 |

Referring to Table 1 and FIGS. 11 to 14 together, it is confirmed that in Example 1, the groove pattern is hardly visible as compared with Comparative Examples 1 to 3. Specifically, in Example 1, as compared with Comparative Example 1 in which only the silicon based resin was filled in each of the plurality of grooves, the visibility is reduced by half. From this, it is confirmed that when the nano helix structure is disposed on the filler, the appearance quality of the display device is significantly improved. In Comparative Example 2 in which the silicon based resin in which silver nano particles are dispersed is filled, it is confirmed that the visibility is lower than that of Comparative Example 1, but the shape of the groove is still visible. Further, in Comparative Example 3 in which the silicon based resin in which silver nano wires are dispersed is filled, it is confirmed that the visibility of the shape of the groove is lower than that of Comparative Example 1, but the appearance quality is inferior to Example 1.

Experimental Example 2

The visibility of the pattern of the bottom plate prepared according to Examples 1 to 4 to the user, a dent characteristic, and a restoration degree were evaluated. The visibility of the pattern was measured in the same manner as Experimental Example 1. The result thereof was represented in Table 2 and FIG. 15. The dent characteristic was evaluated by scratching a surface of a specimen with a pencil under the condition of an angle of 45 degrees and a speed of 300 mm/min while applying a load of 500 g to the specimen and then observing whether the surface was scratched with the naked eye. The restoration degree was evaluated to find how much the alignment of the nano helix structure was restored by the external magnetic field when the alignment of the nano helix structures was deformed and was calculated by the following Equation 1.

$$\text{Restoration degree} = M1 - M2 \qquad \text{[Equation 1]}$$

In Equation 1, M1 refers to a visibility of a pattern in a zero magnetic field state in which there is no influence of the magnetic field and M2 refers to a visibility of the pattern after exposing the specimen to a magnetic field with a specific magnitude for one hour.

Figure 15:
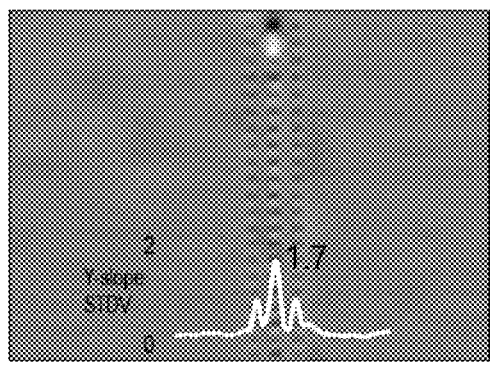
FIG. 15 is a photograph illustrating a visibility of a pattern of Comparative Example 1 and Example 1 according to the presence of a magnetic field.
Figure 15:
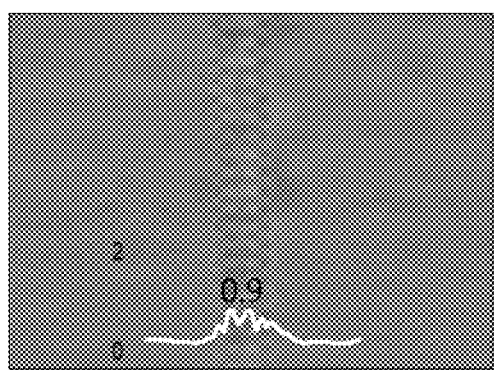
Figure 15:
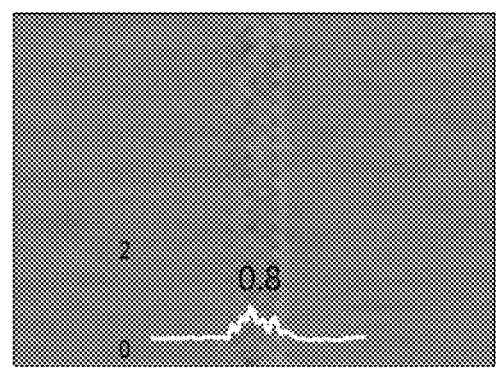

FIG. 15 is a photograph illustrating a visibility of patterns of Comparative Example 1 and Example 1 according to the presence of a magnetic field. FIG. 15($a$) is a photograph showing a visibility of a specimen according to Comparative Example 1 in which the nano helix structure is not transferred onto the filler. FIG. 15($b$) is a photograph showing a visibility of a pattern in a zero magnetic field state of Example 1. FIG. 15($c$) is a photograph showing a visibility of a pattern after applying a magnetic field to a specimen of Example 1.

First, by comparing FIGS. 15($a$) and 15($b$), it was confirmed that after transferring the nano helix structure onto the filler, the visibility of the groove pattern was reduced and the visibility of the pattern of Comparative Example 1 was 1.7 and the visibility of the pattern of Example 1 was 0.9 so that the visibility of the pattern was reduced by half.

By comparing FIGS. 15($b$) and 15($c$), it was confirmed that when a magnetic field of 100 emu was applied to the specimen of Example 1 for one hour, the visibility of the pattern was further reduced and specifically, the visibility of the pattern was reduced from 0.9 to 0.8. It means that this is related to the magnetic susceptibility of the nano helix structures and when the alignment of the nano helix structures is deformed, the nano helix structures are aligned in the single direction again in response to the external magnetic field. That is, according to the exemplary embodiment of the present disclosure, even though the alignment of the nano helix structures is deformed by the operation of repeatedly folding or unfolding the flexible display device, if the magnetic field is applied from the outside by wireless charging, the nano helix structures are realigned in the single direction. Therefore, the high appearance quality may be maintained for a long term.

In the following Table 2, the dent characteristic, the visibility of the pattern, and the restoration degree according to the weight ratio of the nano helix structure were summarized.

TABLE 2

|  | Example 1 | Example 2 | Example 3 | Example 4 |
|---|---|---|---|---|
| Weight ratio of filler:nano helix structure | 98:2 | 96:4 | 94:6 | 92:8 |
| Dent characteristic | 6B | 4B | 1B | HB |
| Visibility of pattern | 0.90 | 0.85 | 0.87 | 1.02 |
| Restoration degree | 0.10 | 0.13 | 0.16 | 0.11 |

Referring to Table 2, it is confirmed that in the case of Example 3 with a ratio of the filler to the nano helix structure of 94:6, all the dent characteristic, the visibility of the pattern, and the restoration degree are excellent. It is confirmed that in the case of Example 1 with a ratio of the filler to the nano helix structure of 98:2, a ratio of the filler having a lower strength is high so that the dent characteristic is the lowest. It is further confirmed that the ratio of the nano helix structure is low so that the restoration degree by the external magnetic field is relatively low. In the meantime, in Example 4 in which the ratio of the nano helix structure is the highest, it is confirmed that the dent characteristic is the most excellent, but the visibility of the pattern is increased by a small amount due to the interaction between the nano helix structure. Further, the restoration degree is also reduced by a small amount as compared with Example 3. However, the visibility of the pattern is much lower than Comparative Example 1 so that it contributes to the improvement of the appearance quality and the bottom plate of Example 4 may be advantageously utilized when it is requested to improve the dent characteristic as well as the appearance quality.

Experimental Example 3

In order to find the restoration degree according to the magnitude of the magnetic field applied from the outside, the restoration degree was measured by varying the magnitudes of the magnetic field with respect to specimens of Examples 1 to 4. The restoration degree was calculated by Equation 1 which is the same as Experimental Example 2. The result was represented in the following Table 3.

TABLE 3

|  |  | Ex. 1 | Ex. 2 | Ex. 3 | Ex. 4 |
|---|---|---|---|---|---|
| Weight ratio of Filler:Nano helix structure | | 98:2 | 96:4 | 94:6 | 92:8 |
| magnetic field intensity, Time | Visibility of pattern | 0.93 | 0.85 | 0.87 | 1.02 |
| 20 emu, One hour | Restoration degree | 0.04 | 0.04 | 0.07 | 0.04 |
| 50 emu, One hour | Restoration degree | 0.07 | 0.07 | 0.10 | 0.06 |
| 100 emu, One hour | Restoration degree | 0.13 | 0.13 | 0.16 | 0.11 |

Referring to Table 3, it was confirmed that in each of Examples 1 to 4, the higher the intensity of the magnetic field applied from the outside, the higher the restoration degree. Further, as described above in Experimental Example 2, it was confirmed that in Example 3 with a ratio of the filler to nano helix structure of 96:4, the restoration degree was the most excellent. It was further confirmed that in Example 4 with the highest ratio of the nano helix structure, the restoration degree was reduced due to the interaction between the nano helix structures, as compared with Examples 1 to 3.

Experimental Example 4

Figure 16:
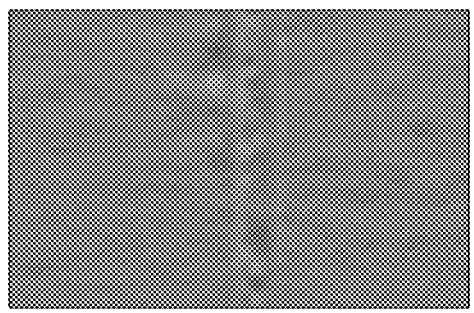
FIG. 16 is a photograph illustrating a visibility and a restoration degree of a groove pattern of a bottom plate according to Example 5.
Figure 16:
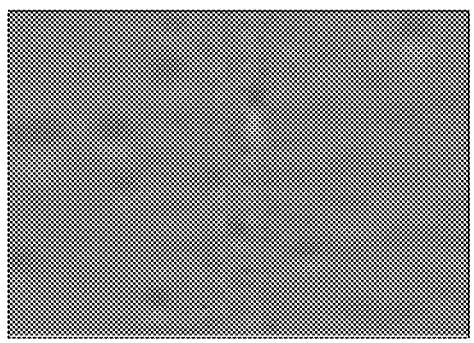
Figure 17:
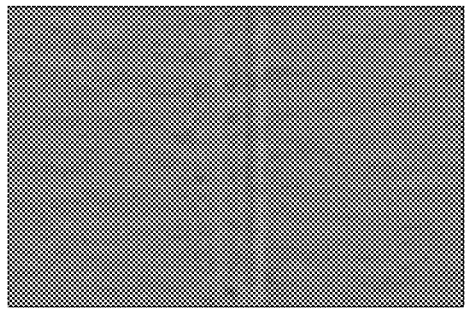
FIG. 17 is a photograph illustrating a visibility and a restoration degree of a groove pattern of a bottom plate according to Example 1.
Figure 17:
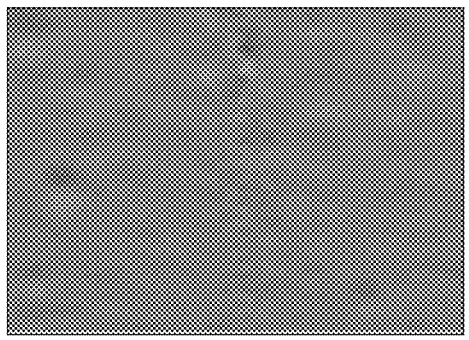
Figure 18:
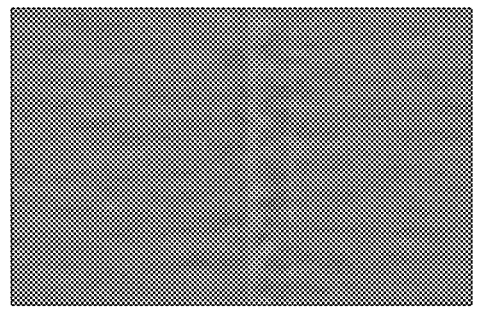
FIG. 18 is a photograph illustrating a visibility and a restoration degree of a groove pattern of a bottom plate according to Example 6.
Figure 18:
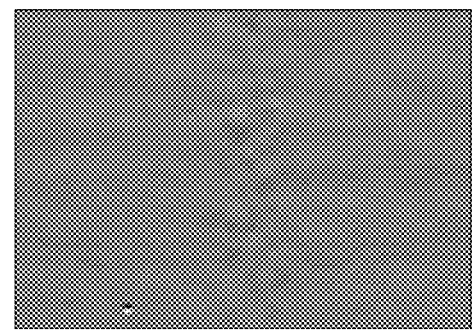

A pattern visibility and a restoration degree of a bottom plate prepared according to Examples 1, 5, and 6 were evaluated. The results thereof were represented in Table 4 and FIGS. 16 to 18. FIG. 16(*a*) is a photograph showing a visibility of a pattern of a bottom plate according to Example 5 and FIG. 16(*b*) is a photograph showing a restoration degree. FIG. 17(*a*) is a photograph showing a visibility of a groove pattern of a bottom plate according to Example 1 and FIG. 17(*b*) is a photograph showing a restoration degree. FIG. 18(*a*) is a photograph showing a visibility of a groove pattern of a bottom plate according to Example 6 and FIG. 18(*b*) is a photograph showing a restoration degree.

TABLE 4

|  | Comp. Ex. 1 | Example 5 | Example 1 | Example 6 |
|---|---|---|---|---|
| Average length of nano helix structure | — | 5 μm | 9 μm | 11 μm |
| Visibility of pattern | 1.77 | 0.97 | 0.93 | 0.95 |
| Restoration degree (100 emu, One hour) | — | 0.09 | 0.13 | 0.10 |

Referring to Table 4, it was confirmed that the visibility of the pattern is significantly reduced as compared with Comparative Example 1 in which the nano helix structure was not included, regardless of the average length of the nano helix structure. Further, referring to FIGS. 16 to 18 together, it was confirmed that in each of Examples 1, 5, and 6, when a magnetic field was applied from the outside, the visibility of the pattern was further reduced so that the restoration degree with respect to the external magnetic field was excellent. Specifically, it was confirmed that in Example 1 in which an average length of the nano helix structure was 9 μm, the visibility of the pattern in a zero magnetic field state was the lowest, but the restoration degree was the most excellent.

The exemplary embodiments of the present disclosure can also be described as follows:

According to an aspect of the present disclosure, a flexible display device comprises a display panel including a folding area and a non-folding area; a back plate which is disposed below the display panel and supports the display panel; a bottom plate which is disposed below the back plate and includes a plurality of grooves so as to correspond to the folding area, and a plurality of nano helix structures disposed so as to correspond to the plurality of grooves.

When a magnetic field or an electric field is applied, the plurality of nano helix structures may be aligned in a single direction.

The plurality of nano helix structures may include one or more selected from zinc oxide, magnesium oxide, and carbon nano tube.

An average length of the plurality of nano helix structures may be 3 μm to 13 μm.

The flexible display device may further comprise a filler which is filled in at least some of the plurality of grooves, wherein the plurality of nano helix structures may be disposed on the filler.

A weight ratio of the filler to the nano helix structure included in the at least some of the plurality of grooves may be 90:10 to 99:1.

Each of the plurality of nano helix structures may be aligned to be directed to a lower surface of the back plate from an upper surface of the filler.

The plurality of nano helix structures may be aligned on the filler with a zigzag pattern.

The flexible display device may further comprise an adhesive layer disposed between the bottom plate and the back plate, wherein the adhesive layer may be disposed to be in direct contact with the filler and the plurality of nano helix structure and to cover the plurality of grooves.

The filler may include a soft polymer or a solder material.

The plurality of grooves may be recessed toward a lower surface from an upper surface of the bottom plate.

Each of the plurality of grooves may extend to be parallel to a folding axis.

The plurality of grooves may be disposed in the folding area with a zigzag pattern.

It will be apparent to those skilled in the art that various modifications and variations can be made in the flexible display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A flexible display device, comprising:
   a display panel including a folding area and a non-folding area;
   a back plate which is disposed below the display panel and supports the display panel;
   a bottom plate which is disposed below the back plate and includes a plurality of grooves so as to correspond to the folding area;
   a plurality of nano helix structures disposed so as to correspond to each of the plurality of grooves; and
   a filler which is filled in each of the plurality of grooves,
   wherein the plurality of nano helix structures are disposed on the filler filled in each of the plurality of grooves,
   wherein within each groove among the plurality of grooves, the plurality of nano helix structures is arranged in a zigzag pattern in plan view,
   wherein a weight ratio of the filler to a nano helix structure included in each of the plurality of grooves is 90:10 to 99:1, and
   wherein the nano helix structure is one of the plurality of nano helix structures.

2. The flexible display device according to claim 1, wherein when a magnetic field or an electric field is applied, the plurality of nano helix structures is aligned in a single direction.

3. The flexible display device according to claim 1, wherein the plurality of nano helix structures includes one or more selected from zinc oxide, magnesium oxide, and carbon nano tube.

4. The flexible display device according to claim 1, wherein an average length of the plurality of nano helix structures is 3 μm to 13 μm.

5. The flexible display device according to claim 1, wherein each of the plurality of nano helix structures is aligned to be directed to a lower surface of the back plate from an upper surface of the filler.

6. The flexible display device according to claim 5, wherein the plurality of nano helix structures is aligned on the filler with the zigzag pattern.

7. The flexible display device according to claim 1, further comprising:
   an adhesive layer disposed between the bottom plate and the back plate,
   wherein the adhesive layer is disposed to be in direct contact with the filler and the plurality of nano helix structures and to cover the plurality of grooves.

8. The flexible display device according to claim 1, wherein the filler includes a soft polymer or a solder material.

9. The flexible display device according to claim 1, wherein the plurality of grooves is recessed toward a lower surface from an upper surface of the bottom plate.

10. The flexible display device according to claim 1, wherein each of the plurality of grooves extends to be parallel to a folding axis.

11. The flexible display device according to claim 1, wherein the plurality of grooves is disposed in the folding area with a zigzag pattern.

12. A flexible display device, comprising:
    a display panel including a folding area and a non-folding area;
    a back plate which is disposed below the display panel and supports the display panel;
    a bottom plate which is disposed below the back plate and includes a plurality of grooves so as to correspond to the folding area;
    a plurality of nano helix structures disposed so as to correspond to at least one of the plurality of grooves; and
    a filler which is filled in each of the plurality of grooves,
    wherein when an alignment of the plurality of nano helix structures is deformed, the plurality of nano helix structures becomes realigned in a single direction in response to a magnetic field or an electric field being applied to the plurality of nano helix structures,
    wherein a weight ratio of the filler to a nano helix structure included in each of the plurality of grooves is 90:10 to 99:1, and
    wherein the nano helix structure is one of the plurality of nano helix structures.

13. The flexible display device according to claim 12, wherein:
    the alignment of the plurality of nano helix structures is deformed from the single direction when the magnetic field or the electric field is not applied to the plurality of nano helix structures; or
    the alignment of the plurality of nano helix structures is deformed from the single direction by an operation of folding or unfolding of the flexible display device.

14. A flexible display device, comprising:
    a display panel including a folding area and a non-folding area;
    a back plate which is disposed below the display panel and supports the display panel;
    a bottom plate which is disposed below the back plate and includes a plurality of grooves so as to correspond to the folding area;
    a plurality of nano helix structures disposed so as to correspond to each of the plurality of grooves; and
    a filler which is filled in each of the plurality of grooves,
    wherein a weight ratio of the filler to a nano helix structure included in each of the plurality of grooves is 90:10 to 99:1, and
    wherein the nano helix structure is one of the plurality of nano helix structures.

* * * * *